(12) United States Patent
Jakab et al.

(10) Patent No.: US 8,686,899 B2
(45) Date of Patent: Apr. 1, 2014

(54) GNSS SMART ANTENNA AND RECEIVER SYSTEM WITH WEATHERPROOF ENCLOSURE

(75) Inventors: Andrew J. Jakab, Calgary (CA); Walter J. Feller, Calgary (CA); Chang Chen, Calgary (CA)

(73) Assignee: Hemisphere GNSS, Inc., Scottsdale, AZ (US)

( * ) Notice: Subject to any disclaimer, the term of this patent is extended or adjusted under 35 U.S.C. 154(b) by 235 days.

(21) Appl. No.: 13/219,335

(22) Filed: Aug. 26, 2011

(65) Prior Publication Data

US 2012/0050104 A1 Mar. 1, 2012

Related U.S. Application Data

(60) Provisional application No. 61/377,355, filed on Aug. 26, 2010.

(51) Int. Cl.
*G01S 19/43* (2010.01)

(52) U.S. Cl.
USPC .................................................. 342/357.26

(58) Field of Classification Search
USPC ............. 342/357.26, 357.27, 357.29, 357.46; 701/468, 470
See application file for complete search history.

(56) References Cited

U.S. PATENT DOCUMENTS

| | | | |
|---|---|---|---|
| 5,523,761 A | 6/1996 | Gildea | |
| 5,557,656 A | 9/1996 | Ray et al. | |
| 6,320,898 B1 | 11/2001 | Newson et al. | |
| 6,516,271 B2 | 2/2003 | Upadhyaya et al. | |
| 6,549,835 B2 | 4/2003 | Deguchi | |
| 6,774,843 B2 | 8/2004 | Takahashi | |
| 6,822,314 B2 | 11/2004 | Beasom | |
| 6,897,328 B2 | 5/2005 | Gutsche et al. | |
| 6,897,828 B2 | 5/2005 | Boucher | |
| 6,999,042 B2 | 2/2006 | Dearnley et al. | |
| 7,006,032 B2 | 2/2006 | King et al. | |
| 7,089,099 B2 | 8/2006 | Shostak et al. | |
| 7,110,762 B1* | 9/2006 | Cameron et al. | .............. 455/434 |
| 7,224,246 B2 | 5/2007 | Thomas | |
| 7,298,325 B2 | 11/2007 | Krikorian et al. | |
| 2005/0174297 A1 | 8/2005 | Cake | |
| 2007/0285308 A1 | 12/2007 | Bauregger et al. | |

(Continued)

FOREIGN PATENT DOCUMENTS

EP 0938190 8/1999

OTHER PUBLICATIONS

Parkinson, Bradford W., et al., "Global Positioning System: Theory and Applications, vol. II" Bradford W. Parkinson and James J. Spiker, Jr., eds., *Global Postioning System: Theory and Applicaitons*, vol. II, 1995, AIAA, Reston, VA, USA, pp. 3-50, (1995),3-50.

(Continued)

*Primary Examiner* — Dao Phan
(74) *Attorney, Agent, or Firm* — Law Office of Mark Brown, LLC; Mark E. Brown; Christopher M. DeBacker

(57) ABSTRACT

A GNSS smart antenna system includes an antenna, a processor and a receiver combination unit adapted for economical construction and enhanced performance when performing differential guidance operations. The antenna unit includes a dual frequency antenna, a dual frequency receiver unit, dual processors, and a radio bay for receiving a radio device. Rover and base smart antenna units are interchangeable in the system.

13 Claims, 16 Drawing Sheets

(56) References Cited

U.S. PATENT DOCUMENTS

| | | | |
|---|---|---|---|
| 2010/0117914 A1 | 5/2010 | Feller et al. | |
| 2010/0211314 A1 | 8/2010 | Zhukov | |
| 2010/0226354 A1 | 9/2010 | Duzdar et al. | |
| 2010/0231468 A1 | 9/2010 | Ogino et al. | |

OTHER PUBLICATIONS

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Papers* vol. 1, Monetrey, California American Institute of Aeronautics and Astronautics, Inc., (May 2004), 136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE* Jul. 29-31, 1998, Chiba, 1115-1120.

Yang, F. et al., "A single layer dual band circularly polorized micropstrip antenna for GPS application", *IEEE Antenna and Propagation Society International Symposium*, vol. 4. pp. 720-723, Jun. 2002, 720-723.

Padhi, K. et al., "An EM-coupled dual-polarized microstrip patch antenna for RFID applications", *Microwave and optical technology letter*, vol. 39., No. 5, pp. 345-360, 2003, 345-360.

Last, J. D., et al., "Effect of skywave interference on coverage of radiobeacon DGPS stations", *IEEE Proc.—Radar, Sonar Navig.*, vol. 144, No. 3, Jun. 1997, pp. 163-168.

"International Search Report and Written Opinion", PCT/US2004/015678, filed May 17, 2004, (Nov. 21, 2006).

"ISO", 11783 Part 7 Draft Amendment 1 Annex, Paragraphs B.6 and B.7.ISO 11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5 No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite DIvision of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

"International Search Report and Written Opinion", International Searching Authority, PCT/US08/88070, Feb. 9, 2009.

Richter, Paul H., et al., "Improved Blind Pointing of NASA's Beam-Waveguide Antennas for Millimeter Wave Operation", *Jet Propulsion Lab Technical Report Series 1992*. Published Apr. 4, 2000.

Keicher, R. et al., "Automatic Guidance for Agricultural Vehicles in Europe", *Computers and Electronics in Agriculture*, vol. 25, (Jan. 2000),169-194.

"KMW Communications", PAC (Portable Antenna Controller); htt://www.kmwcomm.com; Retrieved from internet Jun. 8, 2009.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Apr. 7, 2009).

"International Search Report", PCT/US09/49776, (Aug. 11, 2009).

"International Search Report", PCT/AU/2008/000002, (Feb. 28, 2008).

"International Search Report and Written Opinion", PCT/IB2008/003796,, (Jul. 15, 2009).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

"International Search Report / Written Opinion", PCT/US09/63594, (Jan. 11, 2010).

"International Search Report", PCT/US09/60668, (Dec. 9, 2009).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Jun. 17, 2003), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004),p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>., (May 8, 2006).

"RFS Product Preview", *RFS Product Brochure*, (Dec. 22, 2008),1 of 1.

"International Search Report & Written Opinion", PCT/US10/26509, (Apr. 20, 2010), 1-7.

"PAC-Manual", *KMW RF & Microwave Products—Company Confidential*, (Jul. 9, 2008).

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion" PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

"International Preliminary Report on Patentability", PCT/US2009/033567, (Aug. 10, 2010), 1-8.

"International Preliminary Report on Patentability", International Application No. PCT/2009/063594, International Filing Date Nov. 6, 2009, Priority Date Nov. 10, 2008, Issue Date May 10, 2011.

\* cited by examiner

ROVER

BASE

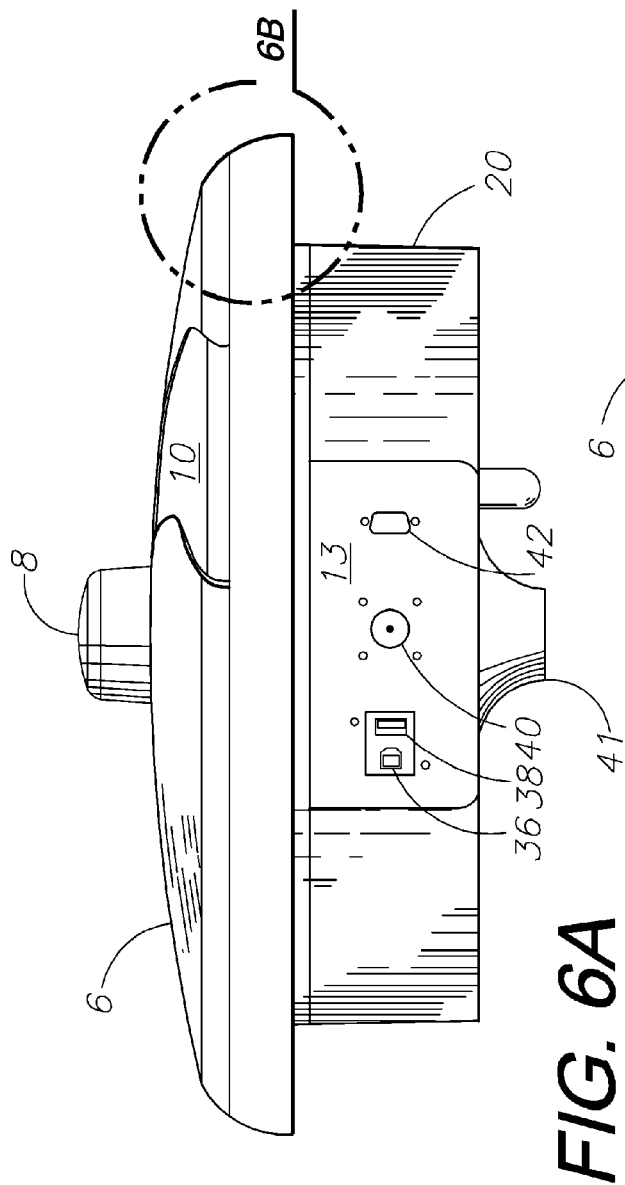
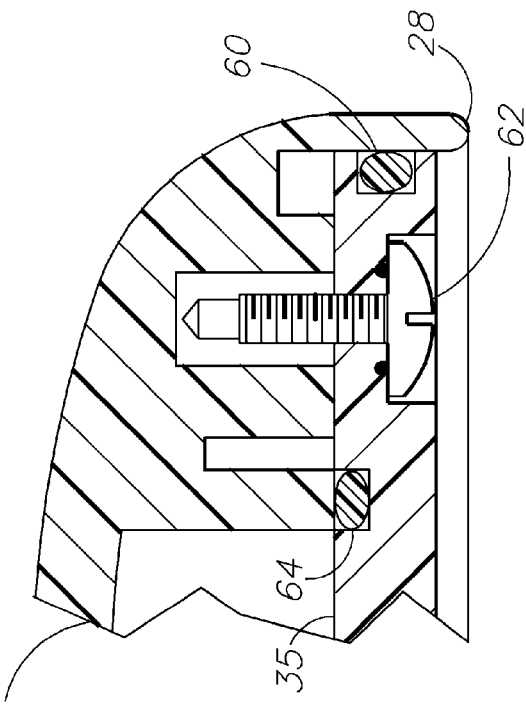
FIG. 6A
FIG. 6B

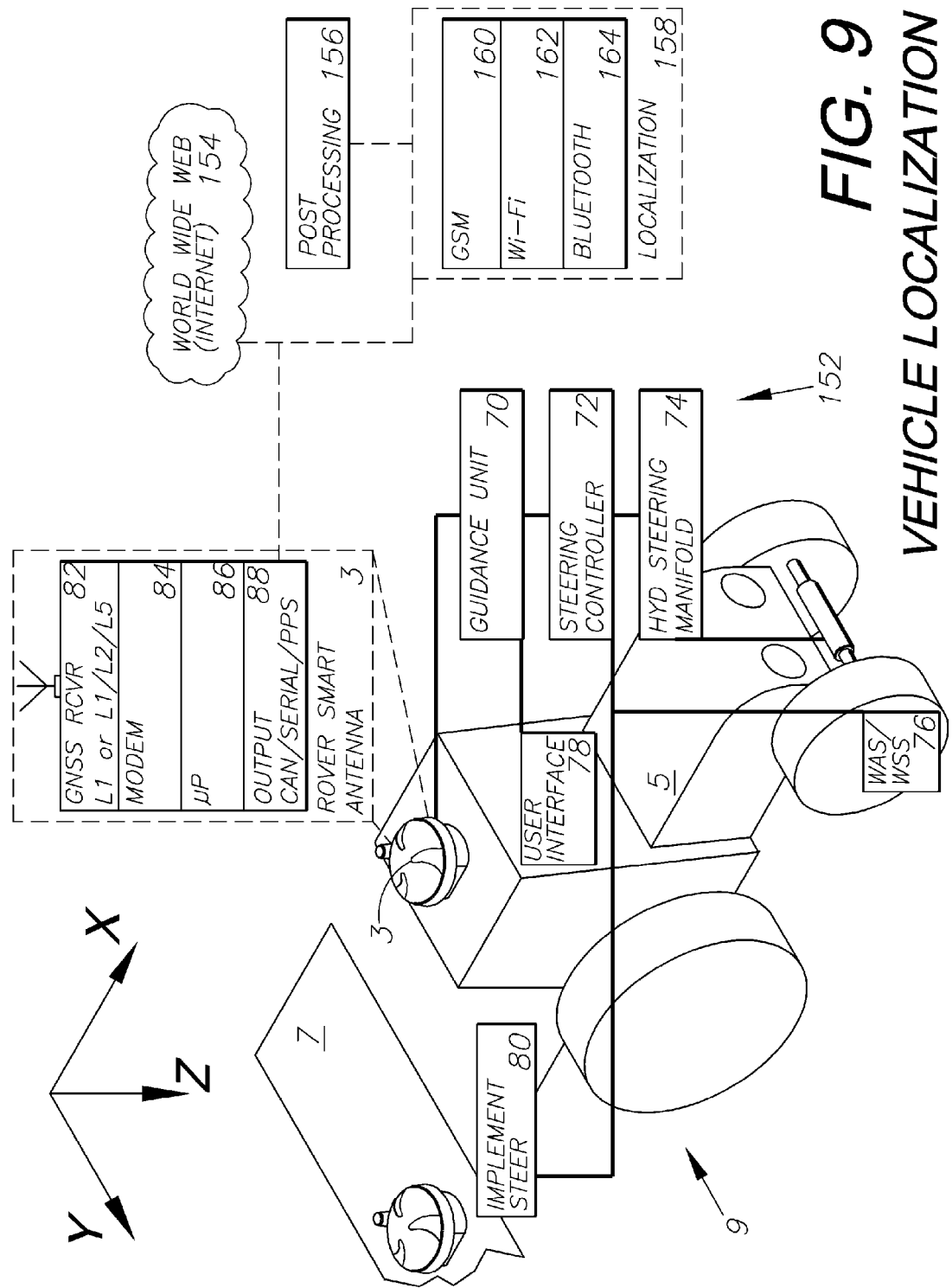

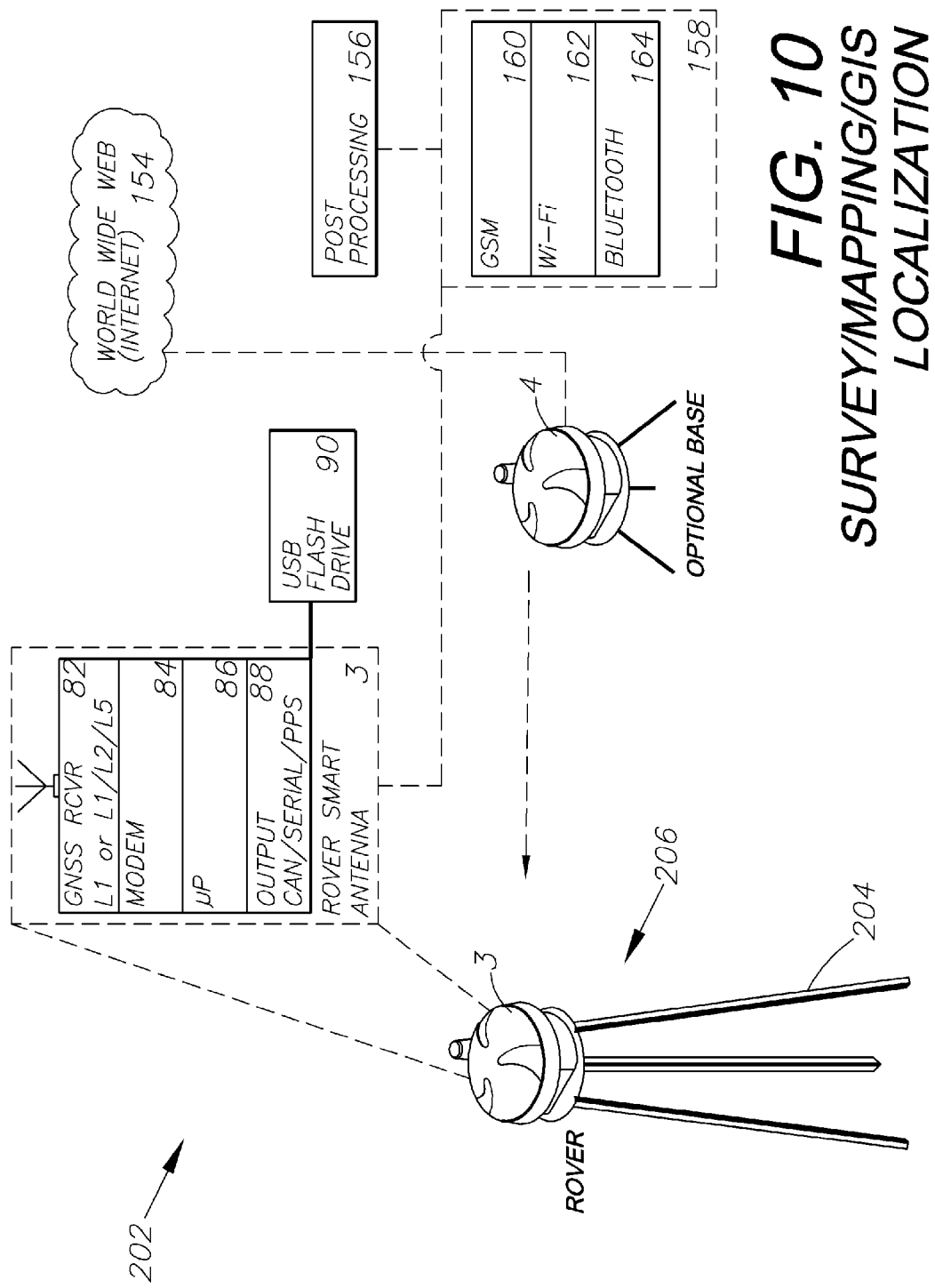
FIG. 10 SURVEY/MAPPING/GIS LOCALIZATION

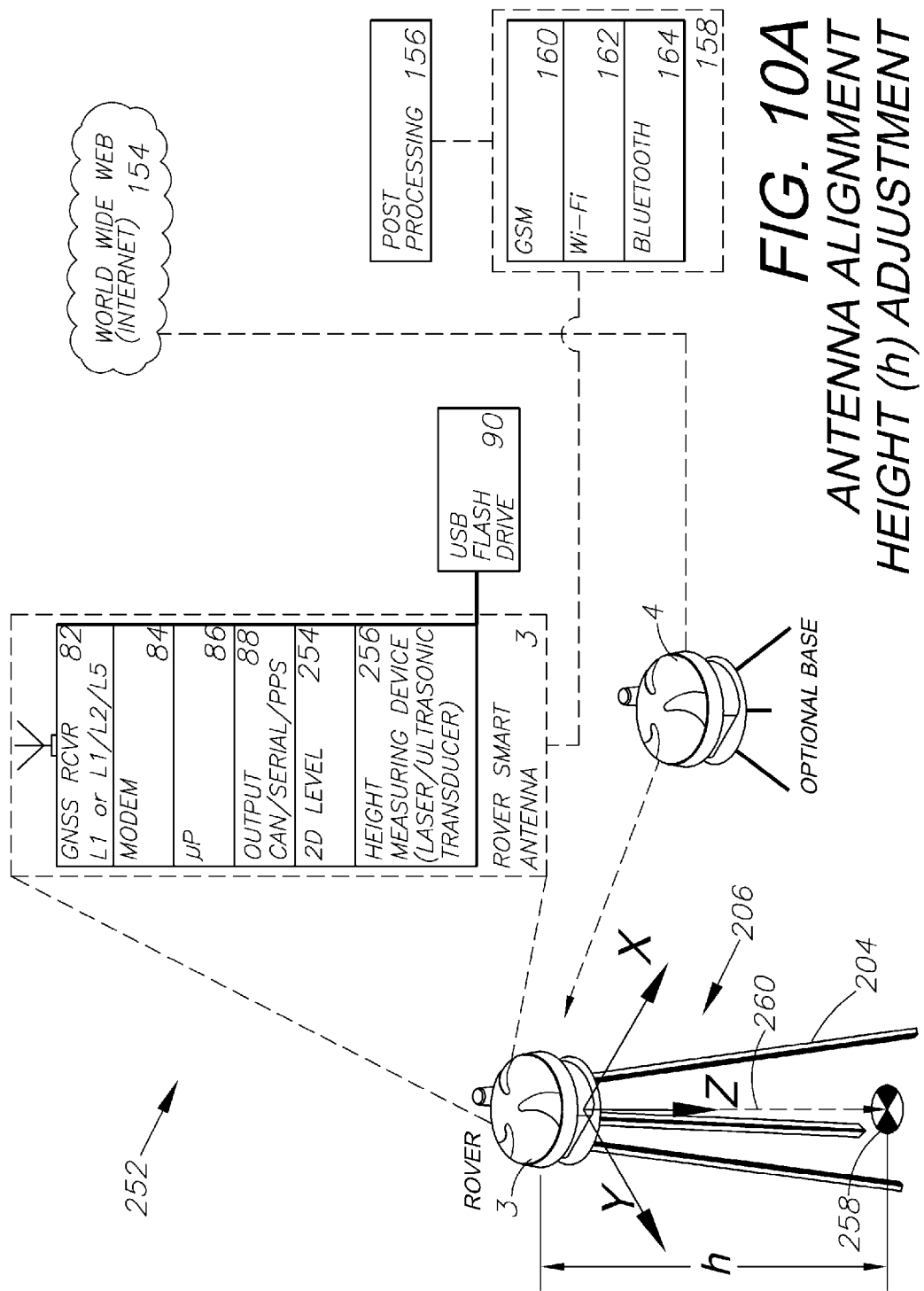

ANTENNA ALIGNMENT

VECTOR GUIDANCE

US 8,686,899 B2

GNSS SMART ANTENNA AND RECEIVER SYSTEM WITH WEATHERPROOF ENCLOSURE

CROSS-REFERENCE TO RELATED APPLICATION

This application claims priority in U.S. Provisional Patent Application No. 61/377,355, filed Aug. 26, 2010, which is incorporated herein by reference.

BACKGROUND OF THE INVENTION

1. Field of the Invention

The present invention relates generally to a rover and base smart antenna system for global navigation satellite systems (GNSSs). Applications include vehicle guidance in real-time kinematic (RTK) and other modes, geographic information systems (GIS), mapping and survey. A weatherproof enclosure is provided for the exposed system components.

2. Description of the Related Art

Movable machinery, such as terrestrial agricultural equipment, agricultural aircraft, open-pit mining machines, earth moving equipment and the like, and vehicles generally, can benefit from accurate GNSS-based guidance and control. For example, satellite positioning systems (SATPS) are extensively used in agriculture for guiding parallel and contour swathing and controlling agricultural equipment through various operations, including precision farming. In order to define swaths across a field (in farming, for example), the guidance system collects positions of the vehicle as it moves across the field. When the vehicle commences the next pass or swath through the field, the guidance system offsets the collected positions for the previous pass by the width of the equipment (i.e. swath width). The next set of swath positions is used to provide guidance to the operator as he or she drives the vehicle through the field.

The current vehicle location, as compared to the desired, swath-defined vehicle location, can be relatively accurately determined with GNSS-based positioning and provided to the vehicle's operator and/or to a vehicle's steering system as an "offset" and a steering heading. The SATPS provides the 3-D location of signal reception at the antenna, which can be defined with geodesic coordinates used by GNSS for positioning and guidance. A common approach to improve accuracy and correct errors caused by losing signal from one or more satellites is to use a remotely located base station receiver/transmitter and a mobile rover receiver/transmitter combination to provide differential GNSS (DGNSS/DGPS) guidance data. The base station is placed at a known location, and will also receive satellite positioning data. Because the base station is at a known location, corrections can be applied to the satellite position data and then transmitted to the mobile antenna and receiver. This position correction can then be applied to the mobile tracking system for a more precise position fix.

GNSS includes the Global Positioning System (GPS), which was established by the United States government and employs a constellation of 24 or more satellites in well-defined orbits at an altitude of approximately 26,500 km. These satellites continually transmit microwave L-band radio signals in three frequency bands, centered at 1575.42 MHz, 1227.60 MHz and 1176.45 MHz, denoted as L1, L2 and L5 respectively. All GNSS signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques employed.

GNSS also includes Galileo (Europe), the GLObal NAvigation Satellite System (GLONASS, Russia), Beidou (China), Compass (proposed), the Indian Regional Navigational Satellite System (IRNSS) and QZSS (Japan, proposed). Galileo will transmit signals centered at 1575.42 MHz, denoted L1 or E1, 1176.45 denoted E5a, 1207.14 MHz, denoted E5b, 1191.795 MHz, denoted E5 and 1278.75 MHz, denoted E6. GLONASS transmits groups of FDM signals centered approximately at 1602 MHz and 1246 MHz, denoted GL1 and GL2 respectively. QZSS will transmit signals centered at L1, L2, L5 and E6.

Other GNSS applications include geographical information system (GIS), such as mapping and surveying. Still further, machine control with GNSS enables precision control of various types of equipment in agriculture, mining, construction, transportation and other operations. GNSS receivers typically require clear views of the sky (i.e. satellite constellations) for ranging signal reception. The antennas are commonly mounted externally to the vehicles and equipment, and are thus exposed to the elements. Weatherproofing external GNSS components is an important design objective.

Many DGNSS systems require an antenna and receiver rover unit on the vehicle being tracked, as well as an antenna and a receiver base unit placed at the base station. The use of a separate receiver and antenna unit requires power to be provided to two units, requires separate housings for each unit, and requires compatibility between the receiver and the antenna. The need for separate receiver and antenna units can increase costs and decrease efficiency.

Heretofore there has not been available an enclosed rover and base antenna system with the advantages and features of the current invention.

SUMMARY OF THE INVENTION

Disclosed herein in an exemplary embodiment is a combination receiver, processor, and antenna unit for DGNSS guidance. This combination is typically referred to as a "smart" antenna. The antenna unit can include an inertial measurement unit (IMU) such as a gyroscope and/or accelerometers, a central processing unit (CPU), memory, and connections between the antenna portion and the receiver portion. The unit includes a weatherproof housing adapted for minimizing size and facilitating component configurations, including RF shielding.

The antenna unit housing design is a primary feature of the preferred embodiment of the present invention. The housing prevents water from entering the unit and damaging sensitive electrical components located therein by using redundant O-rings, fasteners, water runoff areas and other features. RF shielding separates antenna components and receiver components so as not to produce errors in GPS location detection.

Units may optionally include an LCD and interface controls. These allow the user to manually check or adjust settings of the antenna unit quickly and easily while the unit is being used.

BRIEF DESCRIPTION OF THE DRAWINGS

FIG. 6A is a front elevational view of the rover antenna/receiver combination unit.

FIG. 6B is a fragmentary, cross-sectional view of the antenna/receiver combination unit taken generally within circle 6B in FIG. 6A.

FIG. 9 is a perspective view of a smart antenna system comprising a modified aspect of the present invention with a vehicle localization feature.

FIG. 10 is a block diagram of a smart antenna system comprising another modified aspect of the present invention and configured for survey, mapping and geographic information system (GIS) applications.

FIG. 10A is a block diagram of a smart antenna system comprising yet another modified aspect of the present invention and configured for alignment and measuring the height of the antenna for survey, mapping and geographic information system (GIS) applications.

DETAILED DESCRIPTION OF THE PREFERRED ASPECTS

I. GNSS Introduction

Figure 1:
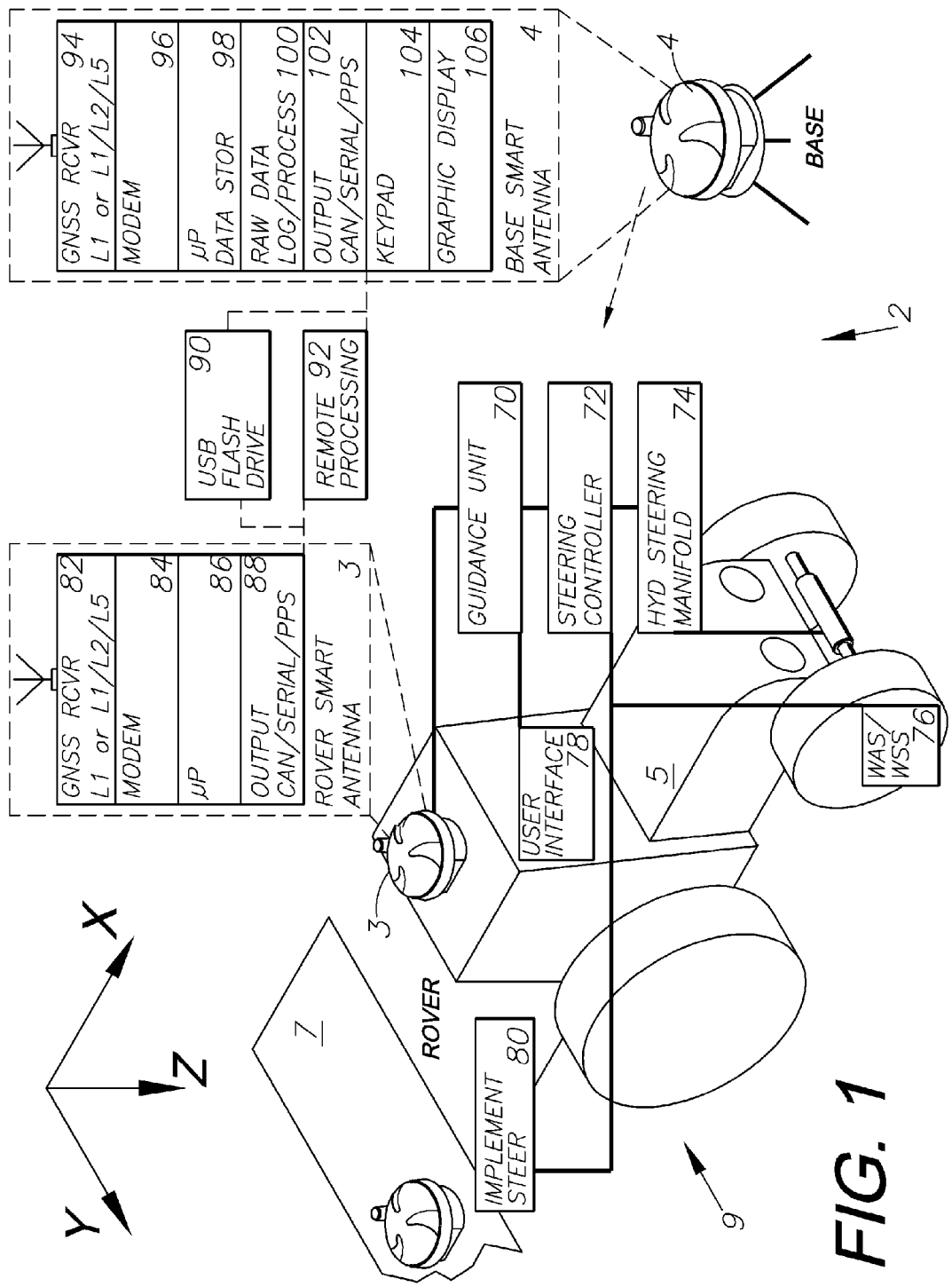
FIG. 1 is a perspective view of a smart antenna system embodying an aspect of the present invention including rover antennas mounted on agricultural equipment and a remote base antenna for providing differential GNSS (DGNSS) guidance and control.

Global navigation satellite systems (GNSS) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along the longitudinal X, transverse Y and vertical Z axes). Roll, pitch and yaw refer to moving component rotation about the X, Y and Z axes respectively. Such terminology will include the words specifically mentioned, derivatives thereof and words of similar meaning.

Disclosed herein in an exemplary embodiment is a sensor system for vehicle guidance. The sensor system utilizes a plurality of GNSS carrier phase differenced antennas to derive attitude information, herein referred to as a GNSS attitude system. Moreover, the GNSS attitude system may optionally be combined with one or more rate gyro(s) used to measure turn (yaw), roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

It is known in the art that by using a GNSS satellite's carrier phase, and possibly carrier phases from other satellites, such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical Z axis) from a position displacement. It will be appreciated that an exemplary embodiment may be utilized to compute not only heading, but either roll (rotation about a longitudinal X axis) or pitch (rotation about a transverse Y axis) depending on the orientation of the antennas relative to the vehicle. Heading information, combined with position, either differentially corrected (DGPS or DGNSS) or carrier phase corrected real time kinematic (RTK) provides the feedback information desired for a proper control of the vehicle direction. The addition of one or more rate gyros further provides independent measurements of the vehicle's dynamics and facilitates vehicle steering control. The combination of GNSS attitude obtained from multiple antennas with gyroscopes facilitates calibration of gyroscope scale factor and bias errors which are present in low cost gyroscopes. When these errors are removed, gyro rates are more accurate and provide better inputs for guidance and control. Furthermore, gyroscopes can now effectively be integrated to obtain roll, pitch and heading angles with occasional adjustment from the GNSS-derived attitude.

GNSS includes the Global Positioning System (GPS), which was established by the United States government and employs a constellation of 24 or more satellites in well-defined orbits at an altitude of approximately 26,500 km. These satellites continually transmit microwave L-band radio signals in three frequency bands, centered at 1575.42 MHz, 1227.60 MHz and 1176.45 MHz, denoted as L1, L2 and L5 respectively. All GNSS signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques employed.

GNSS also includes Galileo (Europe), the GLObal NAvigation Satellite System (GLONASS, Russia), Beidou (China), Compass (proposed), the Indian Regional Navigational Satellite System (IRNSS) and QZSS (Japan, proposed). Galileo will transmit signals centered at 1575.42 MHz, denoted L1 or E1, 1176.45 denoted E5a, 1207.14 MHz, denoted E5b, 1191.795 MHz, denoted E5 and 1278.75 MHz, denoted E6. GLONASS transmits groups of FDM signals centered approximately at 1602 MHz and 1246 MHz, denoted GL1 and GL2 respectively. QZSS will transmit signals centered at L1, L2, L5 and E6.

In standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors.

To overcome the errors of standalone GNSSs, many positioning applications have made use of data from multiple GNSS receivers. Typically, in such applications, a reference receiver, located at a reference site having known coordinates, receives the GNSS satellite signals simultaneously with the receipt of signals by a remote receiver. Depending on the separation distance between the two GNSS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GNSS receivers to improve accuracy is known as "differential" GNSS (DGNSS or DGPS). DGNSS is well known and exhibits many forms. In all forms of DGNSS, the positions obtained by the end user's remote receiver are "relative" to the position(s) of the reference receiver(s), as opposed to "absolute" positions in a 3-D (XYZ) geo-reference system. GNSS applications have been improved and enhanced by employing a broader array of satellites such as GNSS and WAAS. For example, see commonly assigned U.S. Pat. No. 6,469,663 to Whitehead et al. titled Method and System for GNSS and WAAS Carrier Phase Measurements for Relative Positioning, dated Oct. 22, 2002, the disclosures of which are incorporated by reference herein in their entirety. Additionally, multiple receiver DGNSS has been enhanced by utilizing a single receiver to perform differential corrections. For example, see commonly assigned U.S. Pat. No. 6,397,147 to Whitehead titled Relative GNSS Positioning Using a Single GNSS Receiver with Internally Generated Differential Correction Terms, dated May 28, 2002, the disclosures of which are incorporated by reference herein in their entirety.

II. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning III. Smart Antenna System 2

Referring to the drawings in more detail, FIG. 1 shows a smart antenna system 2 associated with and adapted for guiding and controlling a tractor 5 towing an implement 7, collectively comprising an agricultural vehicle or equipment 9. Without limitation, the vehicle 7 is configured for agricultural operations. However, the smart antenna system 2 could also be used for guiding and controlling a wide range of vehicles, equipment and machines. For example, an earthmoving equipment application of the smart antenna system 2 is disclosed in co-pending and commonly-assigned U.S. patent application Ser. No. 12/857,298; U.S. Patent Publication No. 2010/0312428 for GNSS Guidance and Machine Control, which is incorporated herein by reference. A separate receiver unit is not necessary as the rover smart antenna 3 and the base smart antenna 4 are combination receiver and antenna units.

The smart antenna system 2 includes two separate smart antennas units, a mobile rover smart antenna unit 3 and a reference base smart antenna unit 4. The rover antenna unit 3 is attached to the vehicle 9 or another mobile object, while the base unit 4 is placed relative to the area where the vehicle 9 will be driven. Using rover and base antennas is known as differential GNSS guidance (DGNSS). The position of the base antenna 4 is known to the guidance system, and can be used to determine and correct (cancel) GNSS-based positioning signal errors in the rover antenna 3. The roles of the rover and base units 3, 4 can be reversed. For example, a portable reference station for local differential GPS corrections is disclosed in U.S. Pat. No. 7,400,294, which is assigned to a common assignee herewith and is incorporated herein by reference.

The rover antenna unit 3 includes a GNSS receiver 82, a communications modem 84, a microprocessor 86, and an output such as a CAN, PPS or USB serial port 88. The combination of these elements allows the antenna 3 to function as a receiver in addition to a standard receiving/transmitting antenna. The inclusion of a microprocessor 86 allows the antenna 3 to process data, such as instructions transmitted to the antenna from a remote location.

The rover antenna unit 3 is capable of transmitting data to an external source for processing, storage or other purposes. This can be accomplished through the use of a USB flash drive 90, remote processing 92 at a remote computer, or through other means such as direct connection to the antenna output 88. The USB flash drive 90 and remote processing device 92 may both receive data collected by the antenna unit 2, 3, such as the vehicle's actual driving path, and upload data to the antenna unit 2, 3, such as a prior recorded driving path intended for reuse. For example, a GNSS receiver and external storage device are shown in U.S. Pat. No. 7,808,428, which is assigned to a common assignee herewith and is incorporated herein by reference.

The base antenna unit 4 is also comprised of a number of components, such as a GNSS receiver 94, a modem 96, a microprocessor and data storage unit 98, a raw data logging/processing device 100, an output means 102, a keypad 104 and a graphical display 106. The receiver 94 allows the base station 4 to function as a traditional base station transceiver unit without needing separate antenna and receiver devices. The inclusion of the microprocessor and data storage device 98 allows the base antenna unit 4 to be programmed and reprogrammed depending upon the purpose the antenna is to serve. The antenna units 3, 4 gather raw data during operation and save this data internally. It can be offloaded via the output means 102 such as a CAN, PPS or USB serial port, or across the modem 96 to a USB flash drive 90 or to another device.

The base antenna unit 4 includes a keypad 104 and a graphical display 106 for manual reprogramming or adjustments. The keypad 104 and the display 106 allow an operator in the field to adjust the base antenna 4 on the fly without needing access to a personal computer or other device programmed for adjusting the base antenna 4. Changes made to the base antenna 4 could feasibly then be communicated to the rover antenna 3, resulting in reprogramming of the entire smart antenna system 2 in the field without the need for additional equipment.

Typically, the vehicle 9 will also include several optional guidance components, such as a guidance unit 70, a steering controller 72, a hydraulic steering manifold 74, a wheel-angle sensor 76, a user interface 78 and an implement steering controller 80. These components allow the user of the vehicle to control various aspects of vehicle guidance, while the "smart antenna" units 3, 4 provide real time guidance data. GNSS-based autosteering systems are shown in commonly-assigned U.S. Pat. No. 7,437,230 for Satellite Based Vehicle Guidance Control in Straight and Contour Modes and U.S. Pat. No. 7,142,956 for Automatic Steering System and Method, which are incorporated herein by reference.

Figure 2:
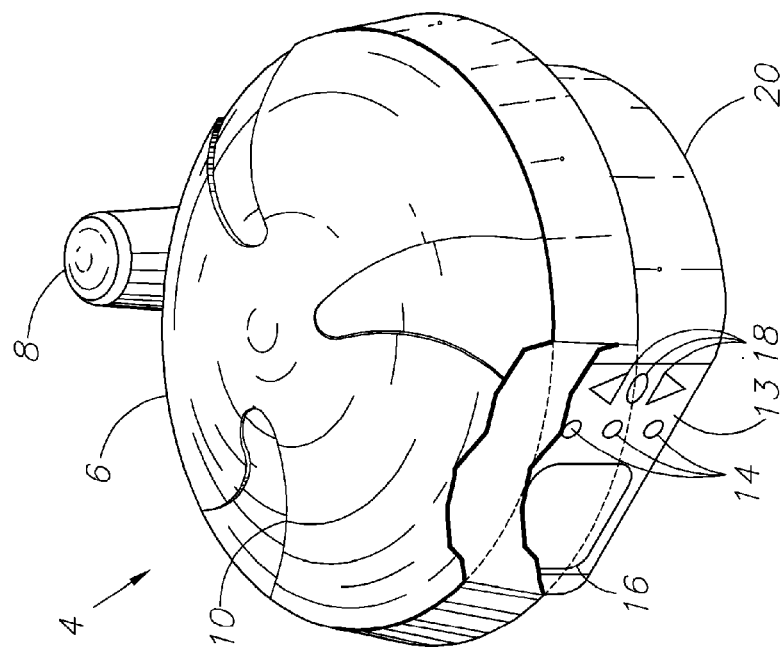
FIG. 2 is a perspective view of a rover antenna/receiver combination unit.

FIG. 2 shows the rover or mobile antenna and receiver combination "smart antenna" unit 3. The unit is an all encompassing enclosure that can contain a dual frequency GPS receiver and a compatible antenna(s). The mobile smart antenna 3 includes a dome casing 6, an antenna stem 8, a component casing 20, connection interfaces 12, and LED indicator lights 14. The connection interfaces 12 and the indicator lights 14 are located on a flat control face 13 of the component casing 20. The dome casing 6 includes a plurality of channels 10 for draining water.

Figure 3:
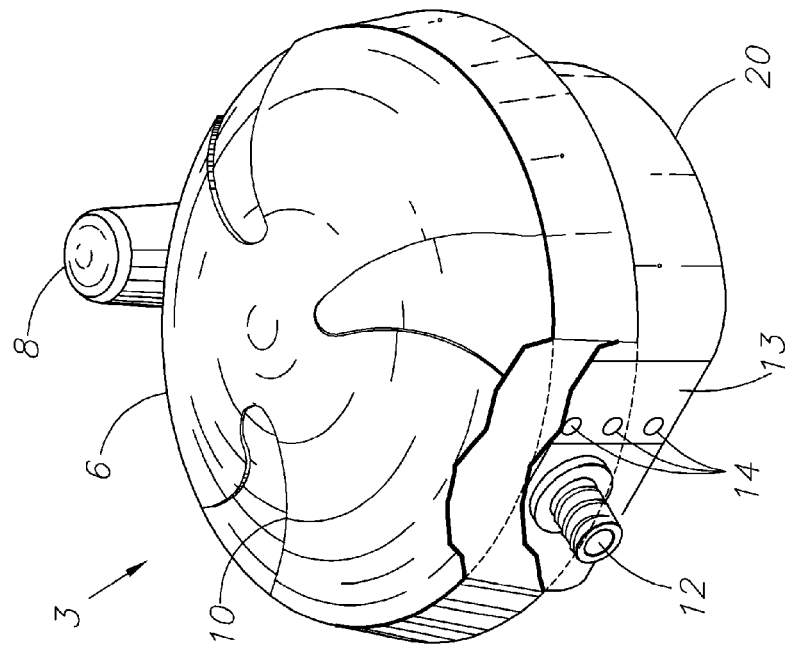
FIG. 3 is a perspective view of a base antenna/receiver combination unit.

FIG. 3 shows a statically-placed base or reference antenna and receiver combination smart antenna unit 4. The unit 4, like the mobile/rover smart antenna unit 3, is an all encompassing enclosure that can include a dual frequency GPS receiver and a compatible antenna. The base antenna 4 includes the same basic components as the mobile antenna 3, including the dome casing 6 with channels 10, component casing 20 with control face 13, and main antenna stem 8. The preferred embodiment of the base antenna 4 includes a display screen 16 and user interface controls 18. These allow the user to manually configure settings of the base antenna 4 in the field without connecting the antenna to a computer at a remote location.

Figure 4:
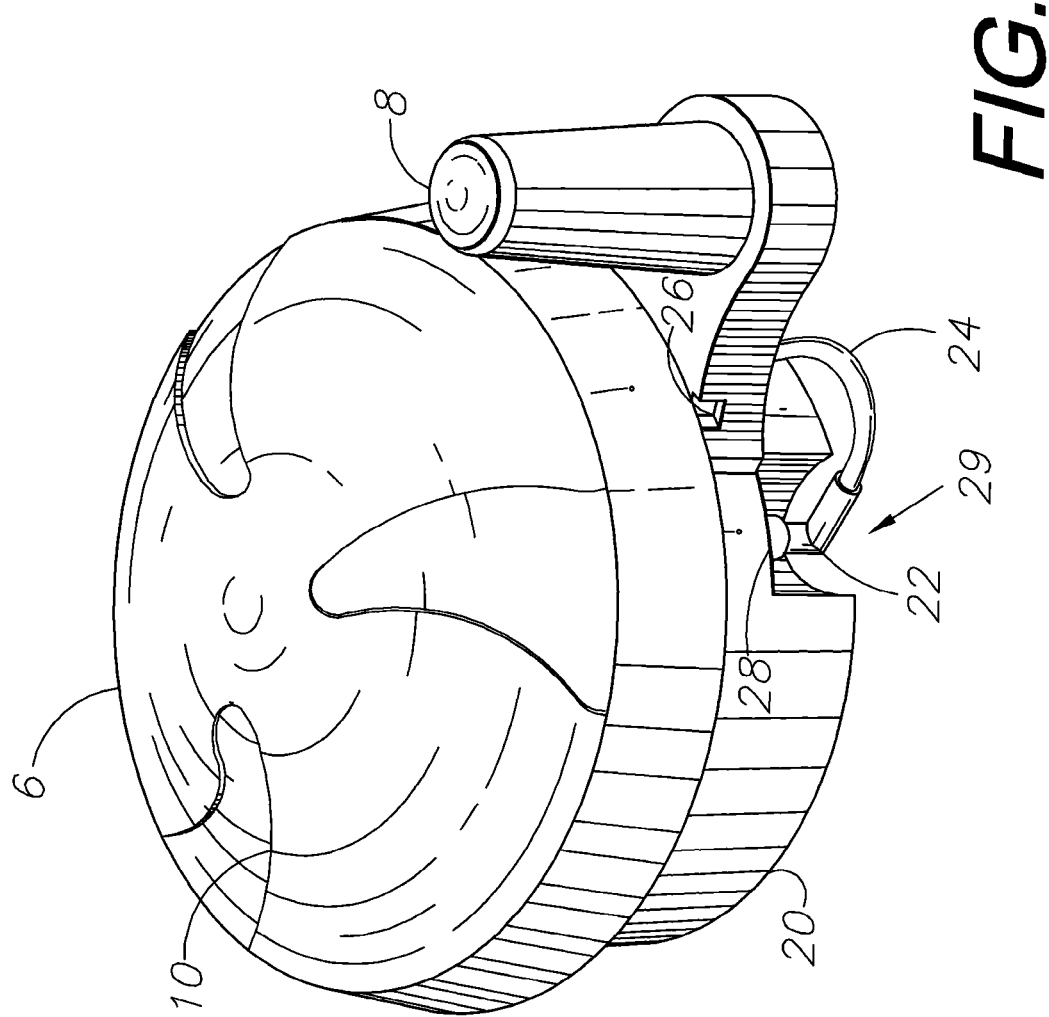
FIG. 4 is another perspective view of the antenna/receiver combination units.

FIG. 4 is another view of either smart antenna unit 3, 4. It shows the antenna from the side of the antenna stem 8 and how the stem connects to the internal components housed within the component casing 20 via a weatherproof antenna connector 22 connected to a weatherproof cable 24 extending from the antenna stem 8 to the component casing 20 and carrying connector cables between the two components. A water channel 26 helps to move water away from the sensitive components of the antenna stem 8 and the weatherproof cable 24. A beveled edge 28 runs along the top of a connector cavity 29 and prevents water from entering the component casing 20 through the connection of the weatherproof antenna connector 22. The dome casing 6 can be interchangeable with additional taller or shorter dome casings depending on the height of the installed antenna 3 or 4.

Figure 5:
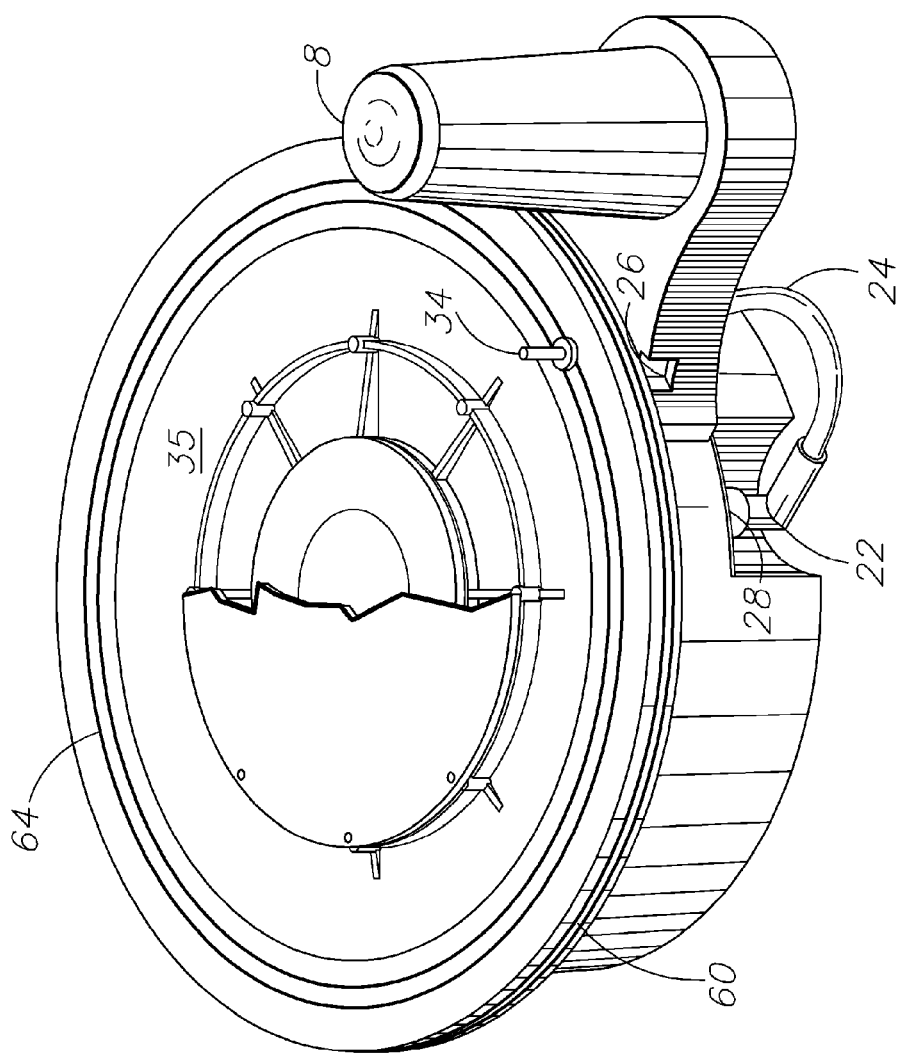
FIG. 5 is another perspective view of the antenna/receiver combination units, with portions of the housing broken away to show internal components.

FIG. 5 displays an internal view of either smart antenna unit 3, 4 showing the components housed under the dome casing 6. A top shelf 35 can include an RF shield 33, which can be made of stainless steel covered in injection molded plastic for preventing signals from interfering with components contained therein. The top shelf 35 mounts the dome casing 6. A registration pin 34 extends into and aligns the dome casing 6.

FIG. 6A shows the control face 13 of the component casing 20 mounting a wide variety of optional control device interfaces as an alternative to the control faces 13 shown in FIGS. 2 (rover) and 3 (base). Shown in FIG. 6A are dual USB connectors 36 (type A) and 38 (type B), a coaxial I/O connector 40, and a DB9 connector 42 for programming and debugging the internal components. Such interfaces may be mounted on the control face 13 or, alternatively, on the bottom of the units 3, 4. The latter configuration frees up the control face 13 for an LCD display screen 16 as shown on unit 4 in FIG. 3. Also shown in FIG. 6A is an optional pole mounting interface 41, which can be internally-threaded.

FIG. 6B shows an enlarged, fragmentary cross section taken generally within circle 6B in FIG. 6A. The cross section shows the connection of the dome casing 6 with the top shelf 35 including a primary O-ring seal 60 and a backup or secondary O-ring seal 64 for keeping water out of the casing 20 and away from sensitive internal components. The secondary O-ring seal 64 and the screws 62 function to hold the casing 6 to the top shelf 35 and to further prevent water infiltration. The dome casing 6 forms a radiused edge 28 which helps to keep water away from the internal components by allowing the water to drip off of the casing 6 instead of following along the body of the casing and against the upper shelf 35. The antenna units 3, 4 are preferably designed for weatherproof, exterior installations with weather-resistant external components and appropriate seals and gaskets for preventing water infiltration.

Figure 7:
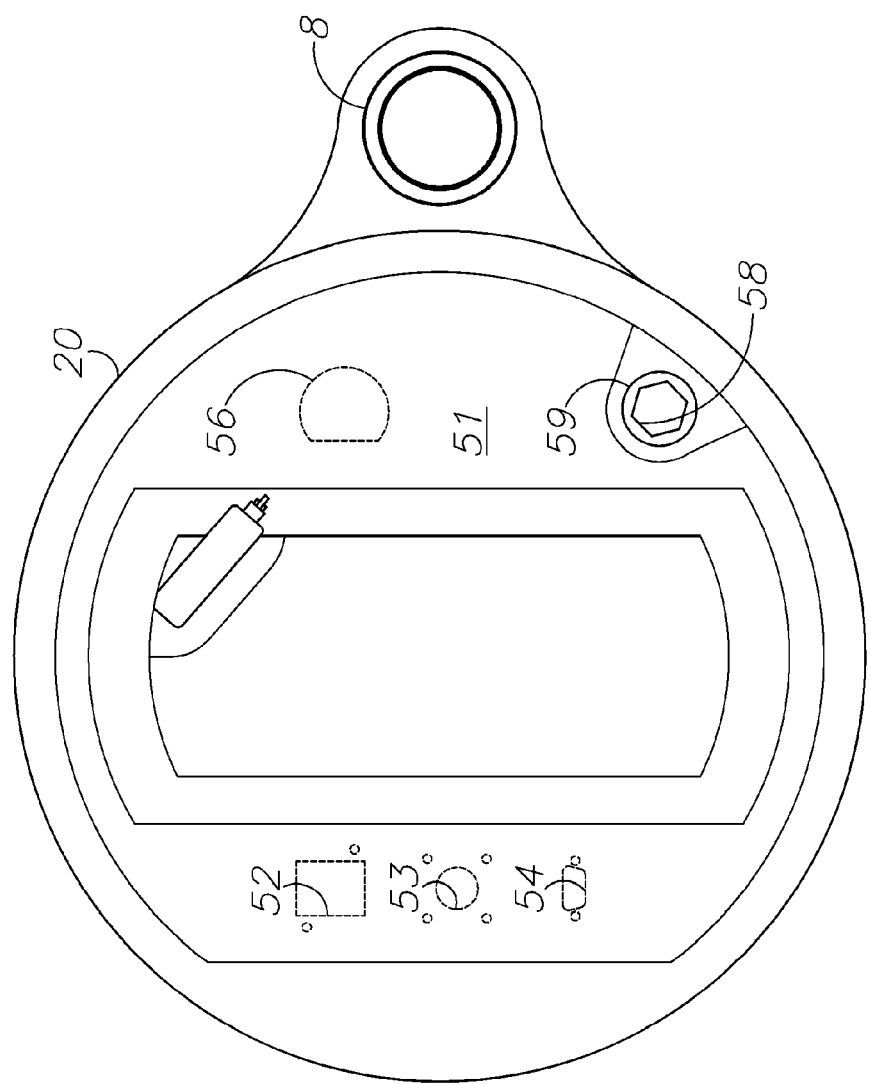
FIG. 7 is a plan view of the antenna/receiver combination unit with the cover removed and showing internal components.

FIG. 7 shows a radio bay enclosure 51 in the component casing 20 of a smart antenna unit 3, 4. The enclosure 51 permits field replacement of a radio or radio components without requiring disassembly of the entire unit 3 or 4. The component casings 20 can be provided with various connector interface ports, such as 52, 53, 54 and a data cable interface 56. A data cable, interchangeable depending on the radio, enters the radio bay through the data cable interface 56. As mentioned above, optional access interface ports for dual USB connectors, a main circular I/O connector, and a DB9 connector can be provided into the radio bay enclosure 51. These interface ports can be initially formed in the enclosure material with perforations and may be "punched" out if needed. An RF cable access port 58 receives the RF cable 24, which plugs into the radio in the radio bay enclosure 51. The access port 58 receives a rubber grommet 59, which seals the port 58 and the RF cable 24, and isolates the RF cable 24 from vibration.

The antenna units 3, 4 can be mounted on poles, tripods or fixed structures for base/reference use at known locations. They can also be removably mounted with magnets, suction cups, adhesives and other fasteners on vehicles for rover use, or fixedly installed as OEM equipment.

Figure 8:
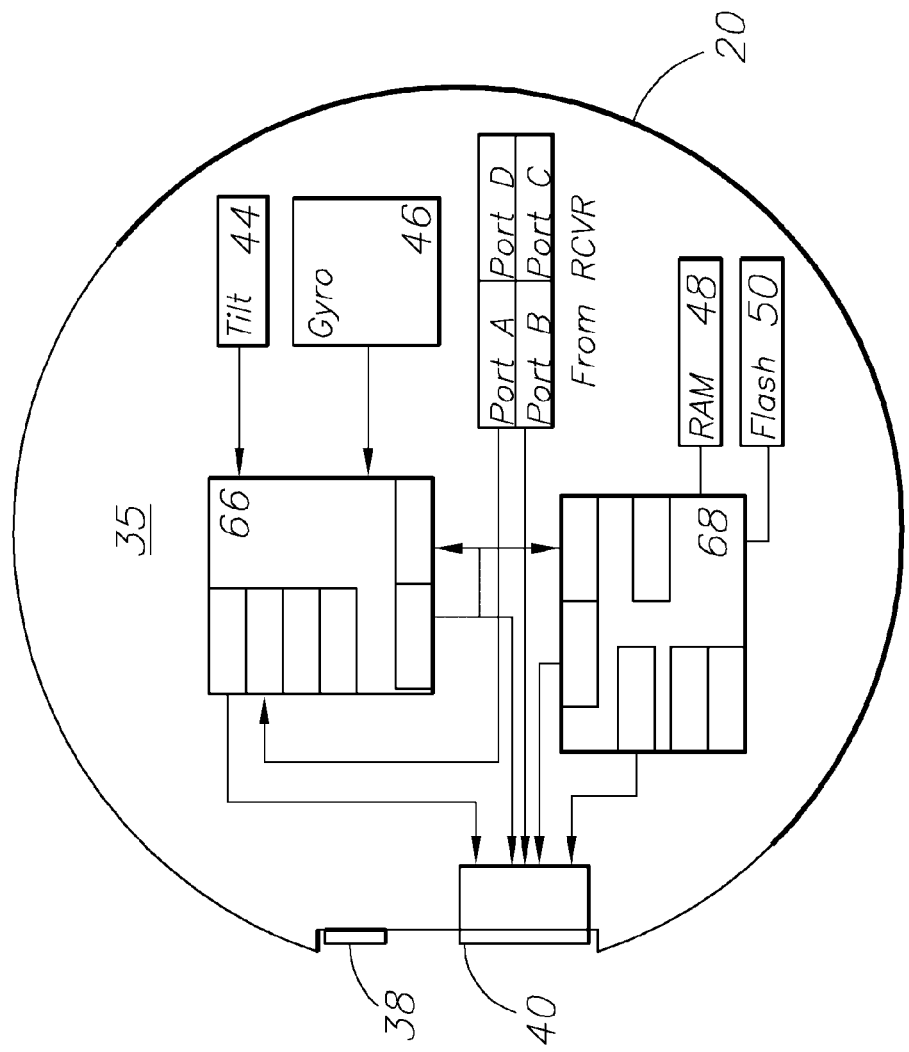
FIG. 8 is a plan view of the antenna/receiver combination unit including a schematic diagram of the internal components.

FIG. 8 shows an internal plan view of electronic components contained within the component casing 20 and mounted on its top shelf 35. The units 3, 4 employ a dual processor architecture and connectivity with the USB connection 38 and the I/O interfaces 40. The first processor 66 is connected to various tilt 44 and gyro 46 components of the overall guidance system 2. The second processor 68 is connected to external or internal RAM 48 or flash memory components 50. Alternative connections also include Ethernet connections or other external peripheral connections.

The present invention provides smart antennas 3, 4 with various electrical components enclosed by the component casings 20 under the dome casings 6 so that the communication distances among the components are minimized.

IV. Alternative Embodiment Smart Antenna Vehicle Localization System 152

FIG. 9 shows an alternative embodiment smart antenna system 152 with a vehicle localization subsystem 158. The rover antenna 3 communicates with the Internet 154 through a connection output 88. This may be via a wireless modem or a hard-wired connection for downloading data. Once connected to the Internet 154, post processing at 156 can be performed on collected data. Additionally, the smart antenna system 152 would be able to connect to GSMs 160, to local Wi-Fi hotspots 162 and to Bluetooth enabled devices 164. These localization elements enable connecting to remote devices outside of the area in which the vehicle 9 is currently deployed.

V. Alternative Embodiment Smart Antenna Survey/Mapping/GIS Localization System 202

FIG. 10 shows another alternative embodiment smart antenna system 202. The smart rover antenna 3 is connected to a tripod 204 for a rover antenna assembly 206. This assembly can be used to survey a tract of land. Because the smart antenna 3 can connect to and communicate with additional localized devices 158 or other devices over an Internet or other connection 154, the smart antenna system 202 provides advantages over existing surveying equipment and surveying systems. The optional addition of a smart base antenna 4 would increase the accuracy of GNSS positioning of the mobile assembly 206.

Figure 10B:
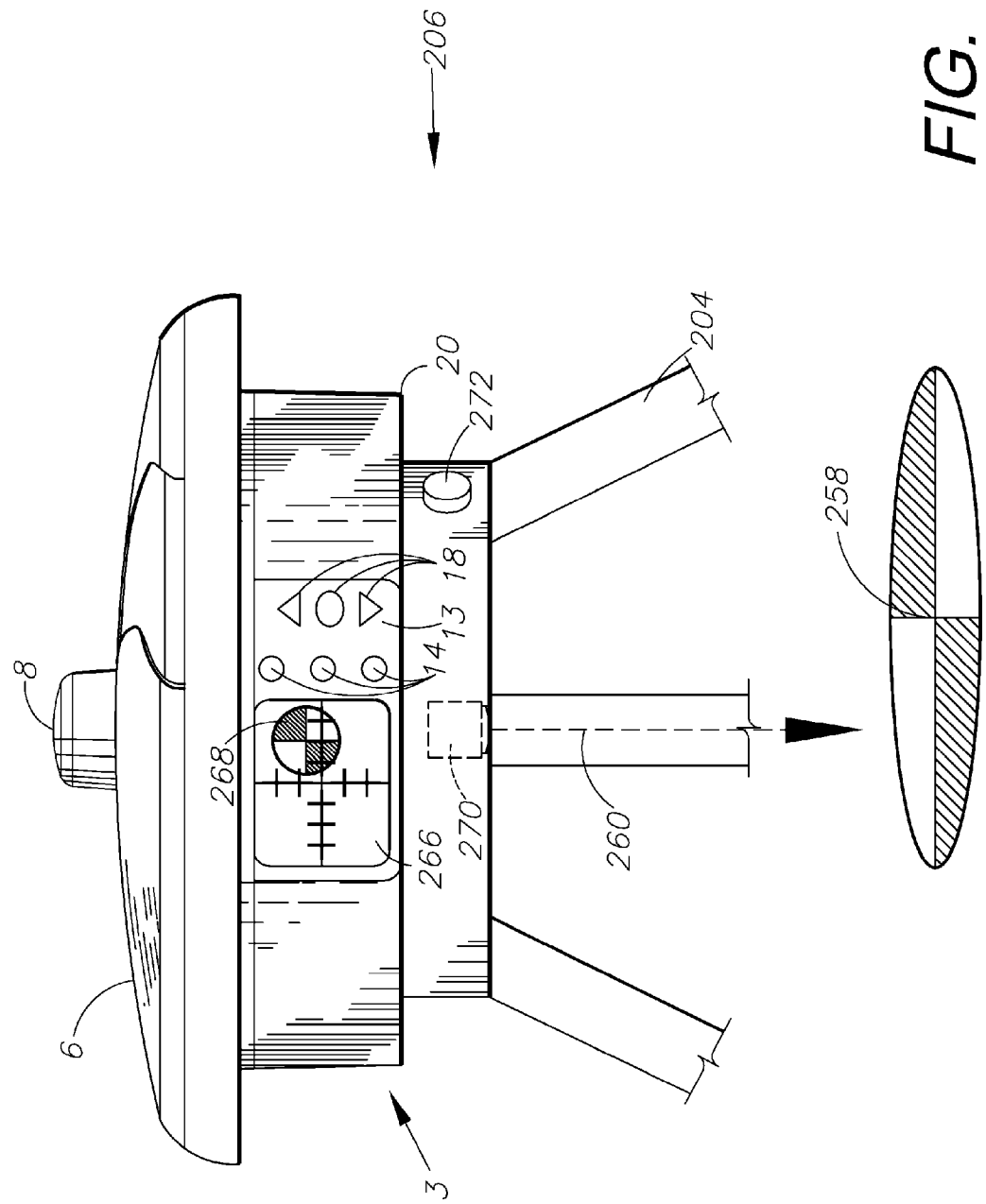
FIG. 10B is a fragmentary, side elevation of the modified aspect smart antenna system showing aligning the rover antenna unit with a benchmark or monument.

VI. Alternative Embodiment Alignment Subsystem 252 for the Smart Antenna Survey/Mapping/GIS Localization System FIGS. 10A and 10B show another alternative embodiment smart antenna system 252 with the rover smart antenna unit 3 including an alignment subsystem 253 including a 2D level 254 and a height measuring device 256. This embodiment provides a technique for aligning a GNSS rover smart antenna 3 over a landmark 258 or other benchmark or monument during surveying operations. The technique permits the user to look forward at a standing antenna 6 located on a tripod 204, ensure the antenna 3 and tripod 206 are level using a 2D level 254, and see the point of alignment of the tripod 204 over the mark 258.

The 2D level 254 includes an accelerometer for detecting a level condition and an LED indicator, which activates when the antenna unit 3 is level, i.e. when a support structure such as a tripod 204 or pole is vertical (plumb). The plumb line or centerline 260 will extend vertically from the mark 258 through the center of the antenna 6. Alternatively, the 2D level 254 can comprise a bubble level or other leveling device.

The height measuring device 256 comprises a laser, an ultrasonic transducer, sonar or other device for measuring the height of the antenna 3. The 2D level 254 is coupled to the height measuring device 256 for correcting the measurements from the height measuring device 256 to compute true orthogonal height. A view window 266 is provided in the control face 13 for observing a reflected image 268 of a benchmark or monument 258 via a viewing device 270 comprising a camera or a reflective mirror in the component casing 20. A record switch 272 can be activated by an operator to digitally record the height offset in the GNSS-based position of the smart antenna unit 3 upon achieving a level position properly positioned over the target benchmark or monument 258, which data is recorded by the microprocessor 86 for further use in computing position solutions, e.g., in GIS/survey/mapping operations.

VII. Alternative Embodiment Smart Antenna Vector Guidance System 302

Figure 11:
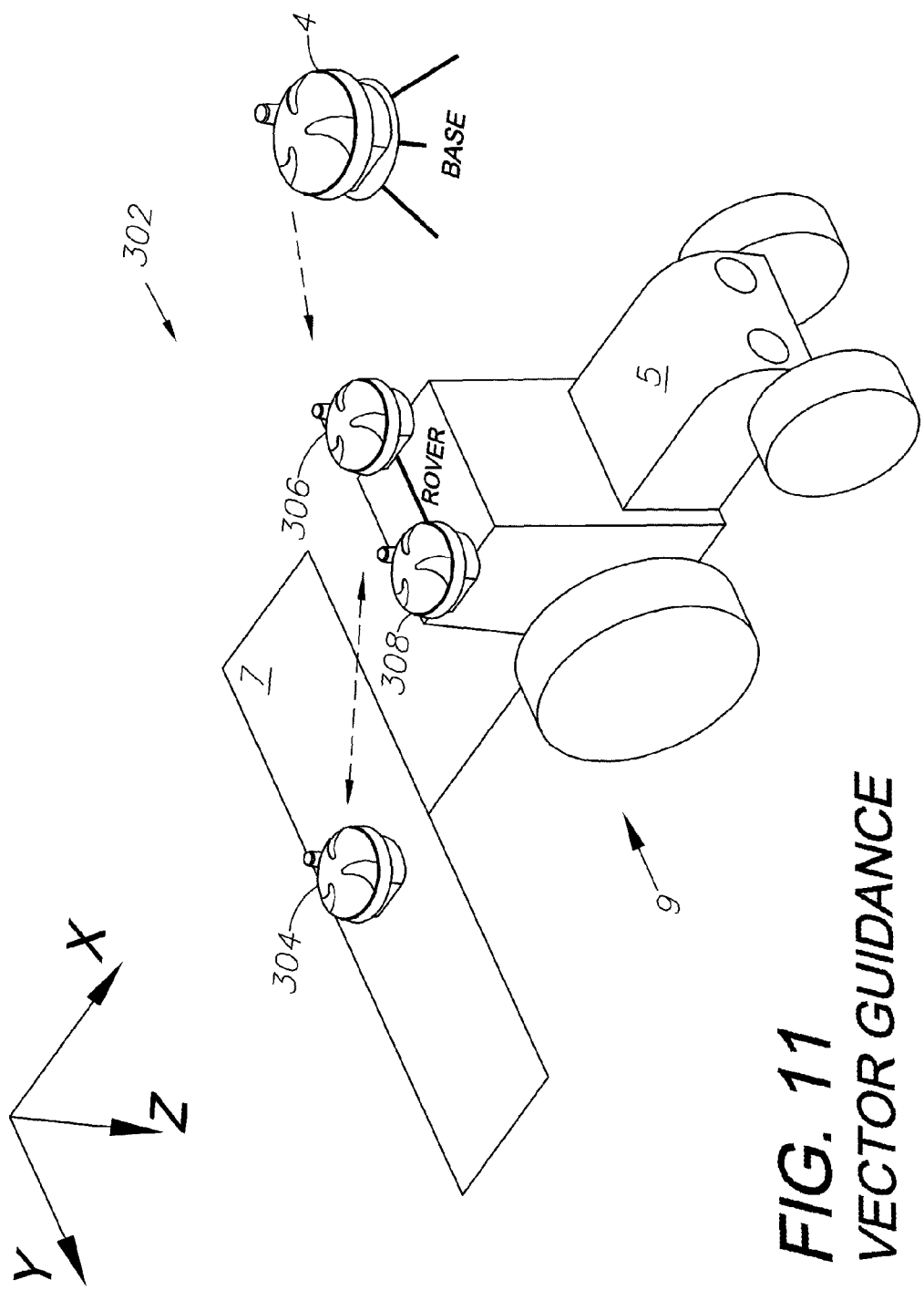
FIG. 11 is a perspective view of a smart antenna system comprising yet another modified aspect of the present invention and configured for multi-antenna vector guidance of agricultural equipment.

FIG. 11 shows an alternative embodiment comprising a vector smart antenna system 302. Multi-antenna system configurations for vector position determination are disclosed in U.S. Pat. No. 7,400,956, which is incorporated herein by reference. The vehicle 9 can include a tractor 5 and an implement 7 and is equipped with at least three smart rover antennas 304, 306, 308. The implement 7 is equipped with the smart rover antenna 304, while the tractor 5 is equipped with the rover antennas 306, 308. Additional antennas can be added for greater accuracy. The use of the smart antennas in a vector arrangement provides vector positioning data output.

VIII. Alternative Embodiment Smart Antenna Unit 402

Figure 12:
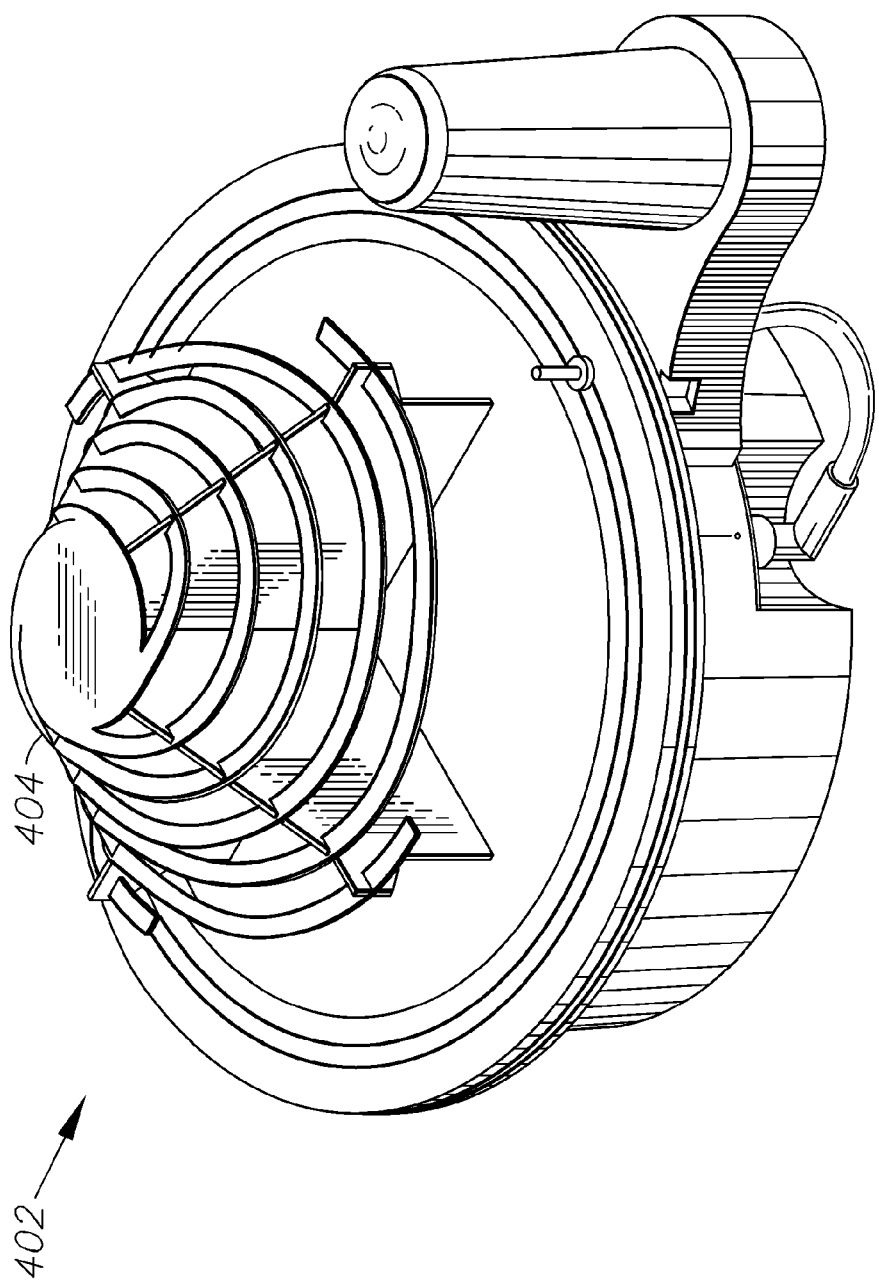
FIG. 12 is a perspective view of another alternative aspect smart antenna with spiral, crossed-dipole antenna elements.

FIG. 12 shows a smart antenna unit 402 comprising another modified embodiment of the present invention with a crossed-dipole, spiral radiating element assembly 404 as shown in U.S. patent application Ser. No. 12/268,241; U.S. Patent Publication No. 2010/0117914, which is incorporated herein by reference.

IX. Alternative Embodiment Smart Antenna Unit 502

Figure 13:
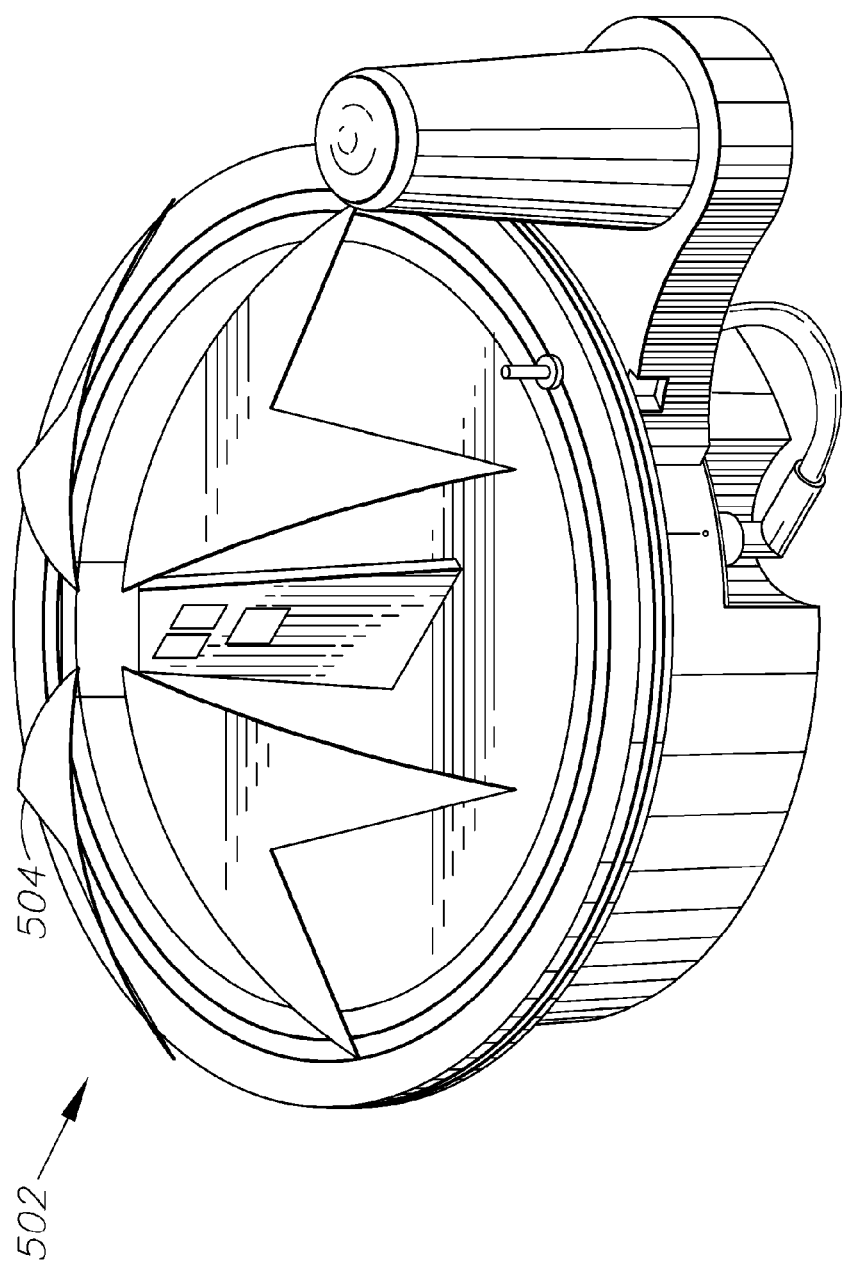
FIG. 13 is a perspective view of another alternative aspect smart antenna with selectable-gain, crossed-dipole antenna elements.

FIG. 13 shows a smart antenna unit 502 comprising another modified embodiment of the present invention with a selectable-gain, crossed-dipole radiating arm element assembly 504, also as shown in U.S. patent application Ser. No. 12/268,241; U.S. Patent Publication No. 2010/0117914, which is incorporated herein by reference.

X. Alternative Embodiment Mobile Battery Management System 552

Figure 14:
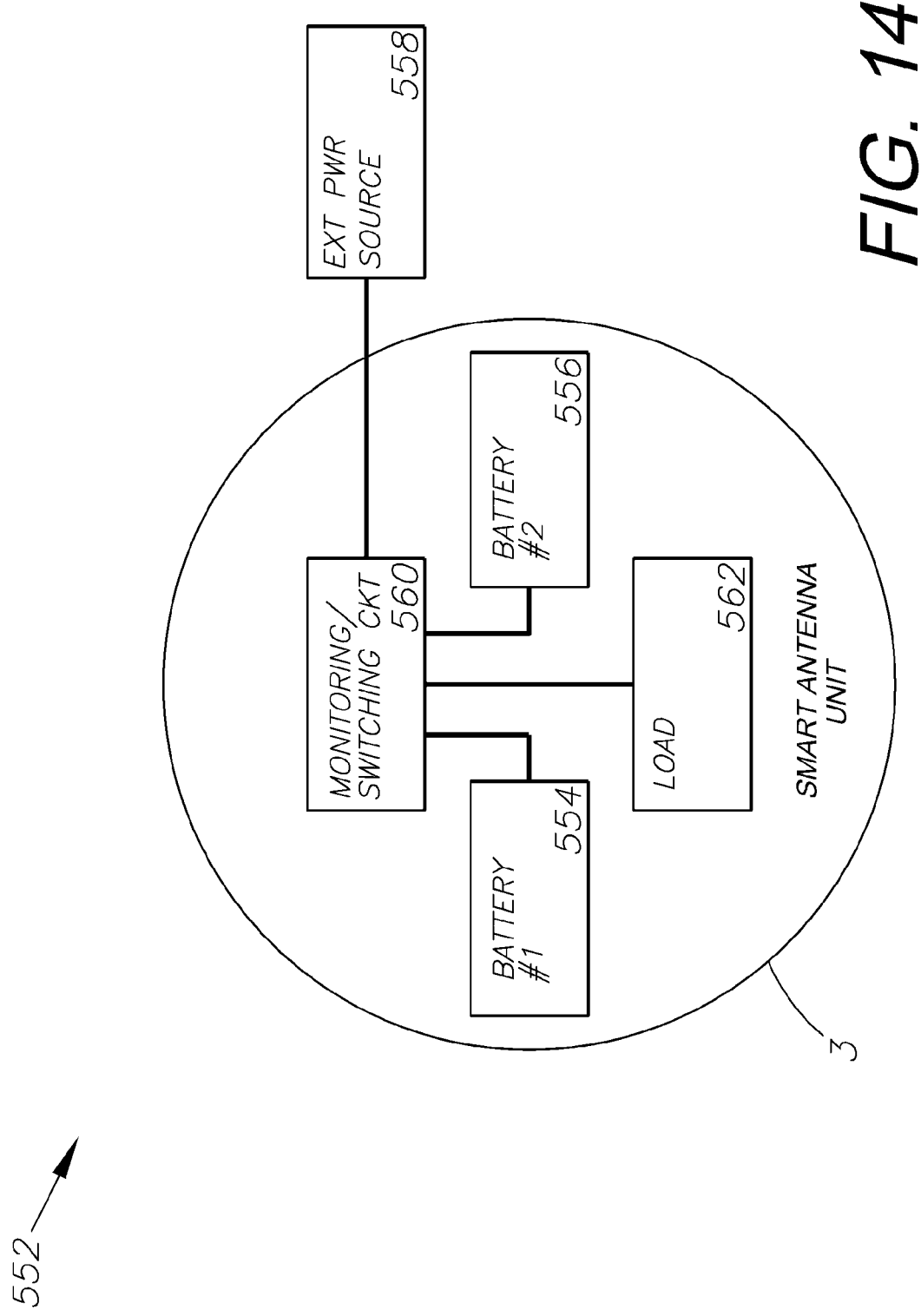
FIG. 14 is a block diagram of a battery management subsystem for the smart antenna system.

FIG. 14 shows a mobile battery management system 552 as it would be used in conjunction with a mobile or stationary smart antenna unit 3, 4. For example, applying the mobile battery management system 552 to a smart antenna surveying system 202 enables continuous operation of the data link, while the antenna units 3, 4 operate on small, rechargeable batteries 554, 556. The system 552 also supports an external power source 558 which will override the use of the internal battery if activated.

This embodiment includes at least two internal batteries 554, 556 located in the antenna unit 3, 4, and a monitoring/switching circuit 560 designed to automatically switch between the two batteries 554, 556 and the alternative external power source 558. A separate switching circuit 560 is used because the unit's microprocessor 86 is likely not suited for fast circuit switching without including large internal capacitors. The analog switching circuit 560 is ideally suited for this function because it can react to the load 562 at appropriate speeds necessary to ensure continuous signal tracking.

Figure 15:
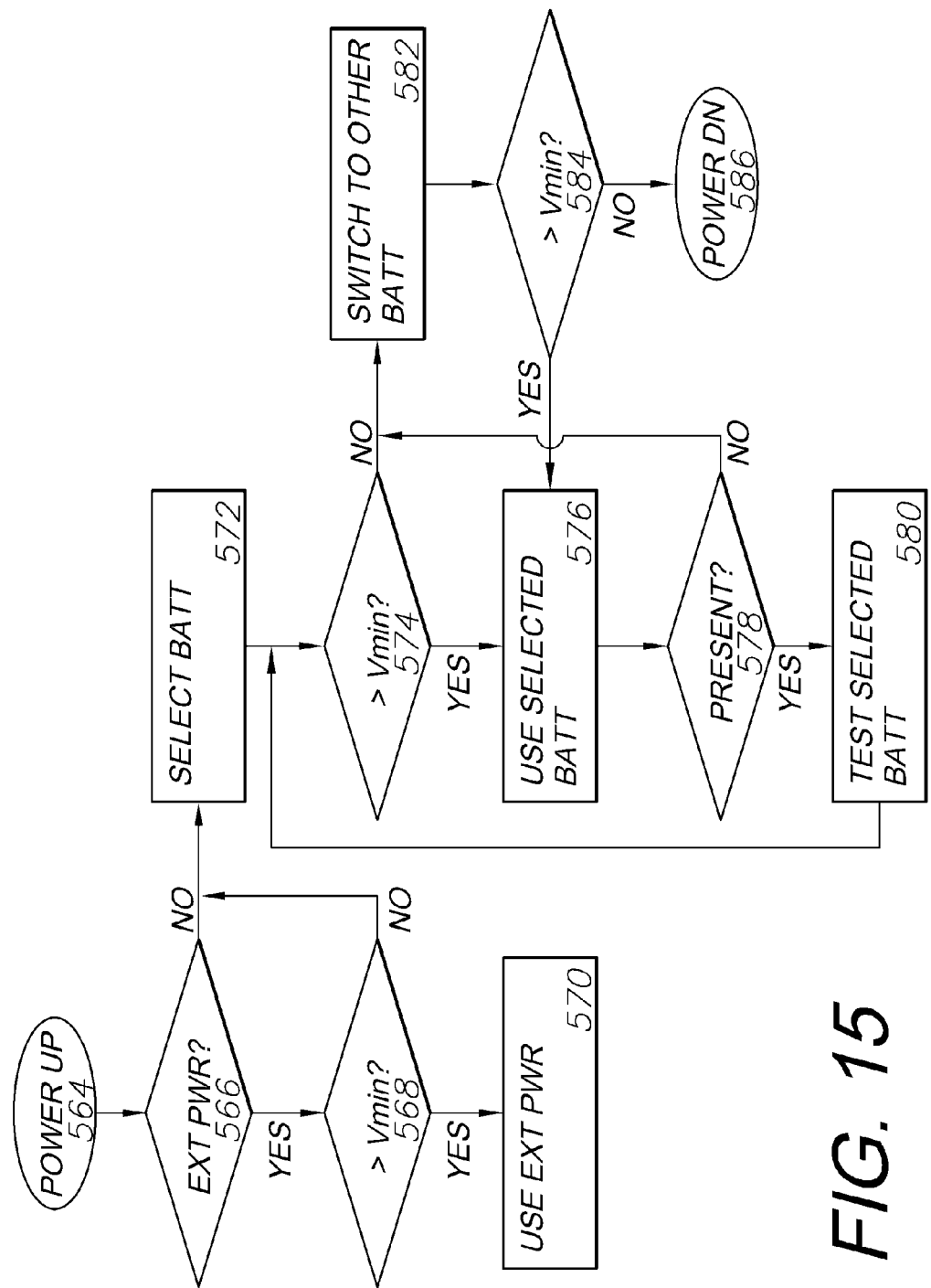
FIG. 15 is a flowchart showing the operation of the battery management subsystem.

The monitoring/switching circuit 560 monitors the voltages of the batteries 554, 556. Selection switches, such as FET transistors with reverse voltage blocking capability, are incorporated into the switching circuit 560. The circuit 560 is designed in logic to select the appropriate battery. For lithium-ion batteries, it is important not to discharge the battery below its recommended minimum voltage. Flowchart FIG. 15 demonstrates the logic employed by the switching circuit 560. Upon power up at 564, the system checks for external power at 566. If external power is connected, the system determines whether the external power is above the minimum operating voltage ($V_{min}$) at 568. If yes, then external power is used at 570.

If no external power is found at 566, or the connected external power source does not satisfy the necessary $V_{min}$ at 568, then the battery with the highest voltage is selected at 572. The system then determines whether the selected battery source is capable of providing voltage above $V_{min}$ at 574. If yes, then the selected battery is used to power the unit at 576.

A check is periodically performed at 578 to determine whether the battery power source is still present. If the source is still present, the battery's voltage is tested at 580, and a check once again determines whether the battery's voltage is greater than $V_{min}$ at 574.

At some point the charge remaining in the selected battery will be reduced to below $V_{min}$. Once the check at 574 returns a "no" response, the system activates the circuit switch and changes to the other battery power source at 582. A similar test is run at 584, where the second battery is checked to determine whether its remaining voltage is greater than $V_{min}$. If yes, then the second battery is used at 576, periodically checked if present at 578, and tested at 580. If the charge in the second battery falls below $V_{min}$ at 574, the first battery will be switched back at 582. At this point, the $V_{min}$ check at 584 will also produce a "no" response because both sources have now been reduced below $V_{min}$, causing the system to power down at 586.

This embodiment permits the user to remove a battery which is declared low by the monitoring/switching circuit 560, resulting in no loss of tracking and thus no need to reacquire RTK GNSS position and correction service. This system will also ensure that batteries are never over-discharged, and will be readily recharged and reused.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of systems.

Having thus described the invention, what is claimed as new and desired to be secured by Letters Patent is:

1. A GNSS system, which comprises:
a rover GNSS antenna and receiver unit including a rover enclosure, a rover GNSS antenna mounted in the enclosure, a rover output device, a microprocessor, and a rover GNSS receiver mounted in the enclosure and connected to the antenna;
rover data transmitted from said output device;
a base GNSS antenna and receiver unit including a base enclosure, a base GNSS antenna mounted in the base enclosure, a microprocessor, a data storage unit, a raw data logging and processing device, a base output device, and a base GNSS receiver mounted in the base enclosure and connected to the base antenna;
base data transmitted from said base output device;
said base antenna and receiver unit including user interface controls and a graphical user interface (GUI) mounted on said base enclosure;
wherein said user interface controls are adapted for receiving programming instructions; and
wherein said programming instructions input into said user interface controls are communicated to said rover GNSS antenna, thereby resulting in programming instructions to said rover GNSS antenna.

2. The system of claim 1 wherein:
said rover output device comprises an output mechanism chosen from the list comprising: a CAN, a Pulse Per Second (PPS) output, and a USB serial port.

3. The system of claim 1 wherein:
said base output device comprises an output mechanism chosen from the list comprising: a CAN, a Pulse Per Second (PPS) output, and a USB serial port.

4. The system of claim 1, further comprising:
a vehicle, wherein said rover GNSS antenna and receiver unit is attached to said vehicle; and
an implement towed by said vehicle.

5. The system of claim 4, further comprising:
a steering controller;
a hydraulic steering manifold;
a wheel-angle sensor;
a user interface; and
an implement steering controller.

6. The system of claim 1 wherein:
each of said rover GNSS antenna and receiver unit and said base GNSS antenna and receiver unit enclosures includes a dome casing and a component casing;
each said dome casing housing a top shelf including an RF shield;
a registration pin extending from each said top shelf into a respective dome casing, thereby aligning said dome casing; and
a primary O-ring seal and a backup O-ring seal located between each top shelf and each respective dome casing.

7. The system of claim 6, further comprising:
each said dome casing including a radiused edge adapted for directing water away from the remainder of the respective said rover GNSS antenna and receiver unit and said base GNSS antenna and receiver unit.

8. The system of claim 6, further comprising:
each said component casing including a radio bay enclosure and a plurality of connector interface ports and at least one data cable interface; and
wherein replacement radio components may be connected to said plurality of connector interface ports without completely disassembling the respective said rover GNSS antenna and receiver unit and said base GNSS antenna and receiver unit.

9. The system of claim 1, further comprising:
a tripod affixed to said rover enclosure; and
wherein said rover data comprises surveying measurements conforming to a preselected tract of land, including geospatial position and elevation of said rover GNSS antenna and receiver unit.

10. The system of claim 1, further comprising:
a crossed-dipole, spiral radiating assembly affixed to at least one of said antenna and receiver unit enclosures.

11. The system of claim 1, further comprising:
a selectable-gain, crossed-dipole radiating arm assembly affixed to at least one of said antenna and receiver unit enclosures.

12. A method of collecting surveying data of a selected tract of land, the method comprising the steps:
locating a base GNSS antenna and receiver unit in proximity to the selected tract of land, said base GNSS antenna and receiver unit including a base enclosure, a base GNSS antenna mounted in the base enclosure, a microprocessor, a data storage unit, a raw data logging and processing device, a base output device, and a base GNSS receiver mounted in the base enclosure and connected to the base antenna;
said base antenna and receiver unit further including user interface controls and a graphical user interface (GUI) mounted on said base enclosure;
placing a rover GNSS antenna and receiver unit over a monument located within said selected tract of land, said rover GNSS antenna and receiver unit including a rover enclosure, a rover GNSS antenna mounted in the enclosure, a rover output device, a microprocessor, and a rover GNSS receiver mounted in the enclosure and connected to the antenna;

said rover antenna and receiver unit further including an accelerometer and a height-measuring device, wherein said height-measuring device selected from the list comprising: a laser, an ultrasonic transducer, and sonar;

detecting tilt of said rover antenna and receiver unit with said accelerometer;

detecting the height measurement of said rover antenna and receiver unit above said monument with said height-measuring device;

transmitting base data comprising at least geospatial position data from said base output device;

transmitting rover data comprising at least geospatial position data and said height measurement from said rover output device;

inputting programming instructions into said user interface controls of said base antenna and receiver unit;

transmitting said programming instructions from said base antenna and receiver unit to said rover antenna and receiver unit; and reprogramming said rover antenna and receiver unit based upon said transmitted programming instructions.

13. The method of claim 12, further comprising the step: affixing a tripod to said rover enclosures.

* * * * *